May 18, 1943.　　W. C. KRAUTHEIM　　2,319,606

RAILWAY TRUCK STRUCTURE

Filed May 18, 1942

INVENTOR:
WILLIAM C. KRAUTHEIM
BY Rodney Bedell
ATTORNEY

Patented May 18, 1943

2,319,606

UNITED STATES PATENT OFFICE 2,319,606

RAILWAY TRUCK STRUCTURE

William C. Krautheim, St. Louis, Mo., assignor to General Steel Castings Corporation, Granite City, Ill., a corporation of Delaware Application May 18, 1942, Serial No. 443,396

6 Claims. (Cl. 105—182)

The invention relates to railway rolling stock and consists in vehicle truck construction including a novel device for connecting relatively movable parts of the truck so as to hold the parts against relative movement in certain directions while accommodating their relative movement in other directions.

More specifically, the invention relates to devices of the general type and purpose described in V. L. Green Reissue Patent No. 21,987, issued December 30, 1941, which illustrates a bolt extending between a truck frame and a truck bolster, there being pads mounted upon the ends of the bolt with means for clamping respective parts of the frame and the bolster between the pads at corresponding ends of the bolt. The device is adapted to transmit forces applied in either direction longitudinally of its length and while the device will accommodate relative movement of the frame and bolster transversely of its length, it offers resistance to such movement, and such movement of the bolster and frame shortens slightly the distance between them.

The main object of the present invention is to space two relatively movable truck parts by an elongated connection between respective elements of the truck parts which will hold the elements substantially in their respective planes extending transversely to the length of the connection, or to the straight line which passes through the elements, irrespective of movement of the parts, in their respective planes, relative to each other. It is an additional object to provide cushioned resistance to the transmission of forces from one of the truck parts through the connection to the other truck part and at the same time to accommodate relative movement of the parts, under cushioned resistance, in directions transversely of the length of the connection.

These objects are attained by arranging connections extending in opposite directions from at least one of the truck part elements and constructing each connection so that thrusts transmitted by it from one truck part to the other are firmly resisted by that connection while considerably less resistance is offered by that connection to forces tending to move the elements it connects away from each other, thus readily accommodating the relative movement of the parts transversely of the device, or of the line between the interconnected elements, which movement tends to increase the distance between the interconnected elements.

These and other objectives as will appear below are attained by the structure illustrated in the accompanying drawing in which—

Figure 3:
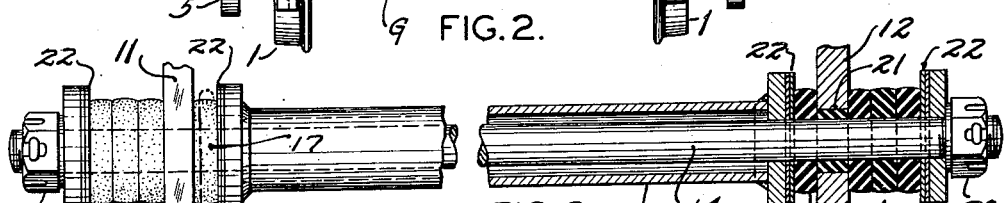
Figure 3 is a detail view and section of one of the anchoring devices connecting the truck frame and the brake gear carrying frame.
Figure 4:
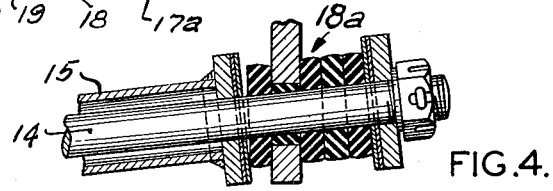

Figure 4 corresponds to one end of Figure 3 but illustrates the parts in an abnormal position.

Figure 1:
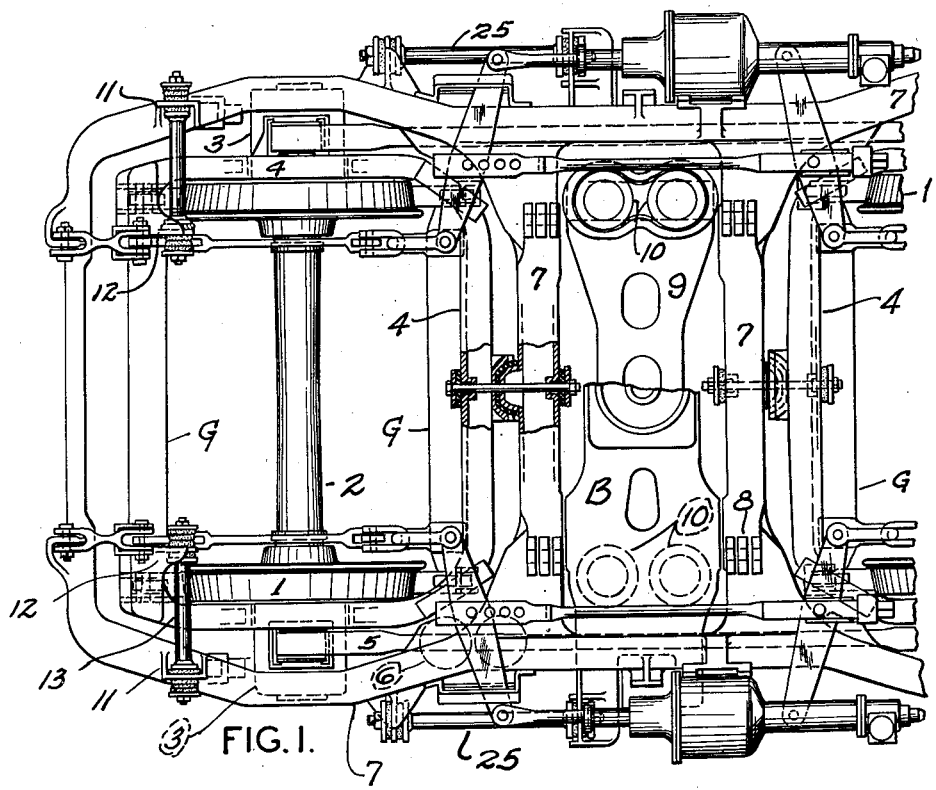
Figure 1 is a top view of a portion of a four-wheel truck with the axle journal boxes supporting the truck frame and a separately formed brake gear carrying frame, there being anchoring devices between the frames to hold them against relative movement transversely of the truck and accommodating their relative movement vertically of the truck.
Figure 2:
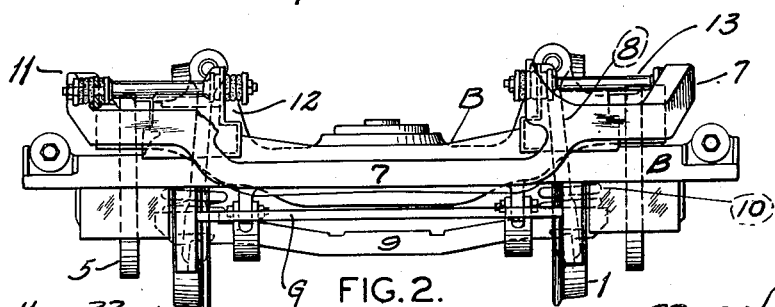
Figure 2 is an end view of the left hand portion of the truck shown in Figure 1.

The truck shown in Figures 1 and 2 corresponds to that illustrated in the application of H. M. Pflager, filed March 16, 1942, Serial No. 434,898, and includes wheels 1, axles 2 provided with journal boxes 3 carrying U-shaped brake frames 4 and equalizer bars 5. Coil springs 6, seated on the equalizers 5, support the truck frame 7. The brake frame 4 is supported directly on journal boxes 3, and brake gear indicated at G is suspended from this frame and moves vertically in unison with wheels 1, thereby insuring more correct application of the brakes to the wheels and reducing or eliminating the application of undesirable forces to the truck frame when the brakes are applied. Swing hangers 8, pivotally suspended from frame 7, support a spring plank 9 with springs 10 and a bolster B in a well-known manner and the vehicle body (not shown) is mounted on the bolster.

Truck frame 7 includes brackets 11 at opposite sides of the truck and brake frame 4 includes rigid brackets 12, each opposing but spaced substantially from a corresponding bracket 11 on the truck frame. An anchor device, indicated generally at 13 and detailed in Figure 3, connects each pair of opposing brackets and under normal conditions the axes of the anchor devices are horizontal and at right angles to the longitudinal center line of the truck.

Each anchor device includes a rod 14 extending through apertures provided therefor in substantially parallel upright flanges or webs 11, 12 of the brackets. A sleeve 15 is slidably received on rod 14 and is shorter than the distance between the upright flanges 11 and 12.

At each end of sleeve 15 is a collar or follower element 16 and between each element 16 and the adjacent bracket flange is a disc-like pad 17 of rubber-like material adapted to cushion but effectively transmit forces from the follower to the associated frame flange. At the opposite side of each frame flange, rod 14 mounts a cushion 18 which may be formed as a series of pads such as indicated at 17 or may comprise a single solid block of rubber-like material or may comprise other yielding structure as, for example, a coil spring. Beyond cushion 18 is a follower 19 and a retaining nut 20. Preferably a bushing 21 surrounds rod 14 where it passes through the frame flange, and one or more shims 22 may be placed between each follower element and the adjacent pad or cushion to facilitate relative positioning of the truck parts.

With the anchor device constructed and arranged as shown between each side of the truck frame and the adjacent portion of the brake frame, any force tending to move these frames relative to each other transversely of the truck or lengthwise of the connection between them will be transmitted primarily by the resistance to compression afforded by one of the sleeves 15, its followers 16, shims 22 and its relatively stiff pads 17, which may distort temporarily a small amount as indicated at 17a in Figure 3. There will be some resistance afforded by the compression of cushions 18 in the devices at the opposite sides of the truck.

If the truck frame and brake frame move relatively to each other vertically of the truck or transversely of the length of rods 14, thus inclining the rods from their normal horizontal position perpendicular to the frame flanges 11 and 12, the increased distance between flanges 11 and 12 will be accommodated by the yielding of the relatively soft cushions 18, as indicated at 18a in Figure 4, without necessarily requiring distortion of the relatively stiff cushions 17 and ordinarily without moving the connected elements out of their respective vertical planes. In other words, the planes of the movements of the elements transversely of the straight line between them will be maintained equidistant.

A cushion 18 consisting of a plurality of sections having the same resiliency as each cushion 17 will provide a greater amount of compression or distortion for a given force, and this would accommodate the increased distance between the flanges of brackets 11 and 12 when relative vertical movement of the brake frame 4 and the truck frame 7 occurs; consequently, there will be a softer cushioning of the forces than is provided for the forces applied to cushions 17, and normally the cushions 17 will keep the frames in proper transverse position. These same results would be obtained if each cushion 18 comprised a single block of the same material and the total thickness of a plurality of sections. Further, the cushions 17 and 18 could have different degrees of resiliency to give the desired amount of resistance and distortion.

While it is preferred that the connection between each end of the anchor device and the associated frame includes a single inner cushion section and a plurality of outer cushion sections, as illustrated in Figure 3, or a relatively stiff and relatively soft cushion arrangement, it is within the scope of the invention to have this type of connection at one end only of the device and to have the connection at the other end include cushions of similar characteristics at both sides of the flange, as shown in the anchor device 25 extending longitudinally of the truck and connecting the truck frame and the laterally movable bolster 8, or the connection at one end of the anchor device may include a pivot consisting of rigid elements as disclosed in the copending application of J. C. Travilla, Jr., filed May 28, 1942, Serial No. 444,811.

Other variations in the structure may be made without departing from the spirit of the invention, and the exclusive use of those modifications coming within the scope of the claims is contemplated.

What is claimed is:

1. In a railway vehicle truck, wheeled axles with journal boxes, a truck load carrying frame spring-supported from said journal boxes so as to move vertically relative thereto and including wheel pieces at opposite sides of the truck with upstanding flanges, a brake gear carrying frame mounted on said journal boxes and substantially free of vertical movement relative thereto and having upstanding flanges between and opposing said wheel piece flanges and spaced therefrom transversely of the truck, an anchor device extending transversely of the truck between each wheel piece flange and the adjacent flange of the brake gear carrying frame, each device comprising a rod extending through and beyond the associated flanges, a sleeve slidable on said rod and of less length than the distance between the associated flanges, a disc-like pad of relatively stiff yielding material on said rod between each end of said sleeve and the adjacent flange, a relatively soft cushion on the rod between each flange and the adjacent end of the rod, and cushion retaining elements on the ends of the rod, whereby a force tending to move said frames relative to each other transversely of the truck is transmitted primarily through the relatively stiff pads and the sleeve between them longitudinally of the devices, while movement of said frames relative to each other vertically of the truck and the resulting inclination of the anchor devices is accommodated primarily by the yielding of the relatively soft cushions as the distance between the retainers and the opposing faces of the flanges is decreased.

2. A device for connecting relatively movable parts of a railway vehicle truck, comprising a rigid elongated sleeve, a rod slidable in said sleeve and projecting longitudinally beyond the ends thereof for assembly with the truck parts, a relatively stiff cushion on said rod at each end of said sleeve, a relatively soft cushion on said rod spaced from but opposing each first-mentioned cushion, and retainers on the ends of the rod for said latter-mentioned cushions, whereby relative movement of the truck parts towards each other is resisted primarily by the relatively stiff cushions and the sleeve between them and relative movement of the truck parts away from each other is accommodated by the yielding of the relatively soft cushions.

3. In a railway vehicle truck, a truck frame having a connection element, a brake frame having a connection element, and an elongated force transmitting device connected at its end portions to respective ones of said connection elements said end portions of said device including cushioning means at opposite sides of the corresponding element, the cushioning means at the side of said element facing the other element being adapted to provide less deflection than the cushioning means at the other side of said element under a given force transmitted through the device.

4. Structure as described in claim 3 in which one of said elongated devices is provided on each side of the truck and extends transversely of said truck and in which said devices tend to hold the brake frame against movement relative to the truck frame in a transverse direction but permit substantially free relative vertical movement between said frames.

5. In a railway vehicle truck, a rigid frame including widely spaced elements, another truck part movable in relation to the frame and having elements between and respectively opposing said frame elements, elongated force transmitting devices each having a connection at one end portion to a respective one of said frame elements and each having a connection at its other end portion to the opposing element of the other truck part, the connections for each device comprising cushions arranged on opposite sides of the associated element, cushion followers on said device, and means limiting the movement of the followers away from the associated element, the cushions applied to the side of each element facing the opposing element on the other truck part being adapted to provide less deflection than the cushioning means at the other side under a given force transmitted through the device, while movement of the truck parts relative to each other transversely of the device is accommodated primarily by the yielding of said cushions to the inclination of said devices from their normal axial positions.

6. A device for connecting relatively movable parts of a railway vehicle truck, comprising a rigid elongated sleeve, a rod slidable in said sleeve and projecting longitudinally beyond the ends thereof for assembly with the truck parts, a relatively stiff yielding member at each end of said sleeve, a relatively soft yielding member spaced from but opposing each first-mentioned member, and retainers on the ends of the rod for said latter-mentioned members, whereby relative movement of the truck parts towards each other is resisted primarily by the relatively stiff members and the resistance to compression offered by the sleeve between them and relative movement of the truck parts away from each other is accommodated by the yielding of the relatively soft members and the resistance to elongation offered by the rod between them.

WM. CHAS. KRAUTHEIM.